Patented Jan. 16, 1934

1,943,744

UNITED STATES PATENT OFFICE 1,943,744

PROCESS OF REMOVING MERCAPTANS FROM HYDROCARBONS

Ludwig Rosenstein, San Francisco, Calif.

No Drawing. Application October 3, 1928
Serial No. 310,184

16 Claims. (Cl. 196—32)

This invention relates generally to processes for effecting removal of hydrogen sulphide and mercaptans from materials, particularly from hydrocarbon products such as those which are derived from a source as petroleum.

It is a general object of this invention to devise a process for the removal of hydrogen sulphide and mercaptans from materials, which will make possible regeneration of the treating solution.

It is a further object of this invention to devise a process which may be separately applied for the removal of mercaptans from materials, and which makes possible regeneration of the solution for reuse.

Further objects of the invention will appear from the following description in which I have set forth the preferred embodiment of my invention. It is to be understood that the appended claims are to be accorded a range of equivalents consistent with the state of the prior art.

In prior processes for the removal of hydrogen sulphide and mercaptans, the treating solution or solutions have been a waste product. As disclosed in my copending application No. 184,434 filed April 16, 1927, which has matured into Patent 1,827,912, Oct. 20, 1931, I have discovered that certain solutions for effecting removal of hydrogen sulphide can be effectively regenerated for re-use. As disclosed in this application, I have also discovered that under certain circumstances a solution for the removal of mercaptans can be regenerated. In order that my process for the regeneration of solutions used in the removal of mercaptans may be effective when treating products containing both mercaptans and hydrogen sulphide, I have discovered that it is desirable to remove the hydrogen sulphide as a separate step, and after this step it is possible to remove the mercaptans in such a way that the removed solution can be effectively regenerated. Thus I have disclosed in this application a system making possible the removal of both hydrogen sulphide and mercaptans, in which both treating solutions can be regenerated for re-use.

Describing my invention as applied to the treatment of hydrocarbon products such as those derived from petroleum I treat the products with a suitable solution for the removal of substantially all hydrogen sulphide, but permit substantially all the mercaptans to remain in the product. In this connection I prefer to employ the removal process described in my above mentioned copending application. This process can be briefly reviewed as follows: A suitable alkaline solution whose hydroxide ion concentration is not sufficient to cause it to react to any appreciable extent with mercaptans, such as an aqueous solution of sodium carbonate and sodium bi-carbonate, is contacted with the hydro-carbon product. It will be apparent to those skilled in the art that a solution of equivalent hydroxide ion concentration may be produced by dissolving sodium phosphates, borax and other well known alkaline salts of weak acids, in water. Such a solution is one having a pH value between $10^{-12}$ and $10^{-8}$. Hydrogen sulphide in the product reacts with the solution to form soluble sulphur compounds which are removed together with the treating solution. The solution is then regenerated, preferably by oxidation in the presence of a suitable catalyst such as sulphides of nickel or cobalt. During this regeneration step sulphur is precipitated and the solution can then be reused for treating another batch of product.

After the above treatment, the hydro-carbon is contacted with an alkaline solution, preferably an aqueous solution of sodium hydroxide, whose hydroxide ion concentration is such to cause it to react with mercaptans to form mercaptides of the alkali metal. It will be apparent to those skilled in the art that a solution of sufficient strength may also be prepared by using potassium hydroxide or highly concentrated solutions of sodium and potassium carbonate. A solution of sodium hydroxide having a pH value of $10^{-13}$ and upwards has been used successfully. The treatment can be effected with the hydrocarbon either in the liquid or vapor phase, although the vapor phase is to be preferred, and temperatures of treatment may be either normal or somewhat elevated. At about 50 degrees C. the removal of mercaptans by dilute sodium hydroxide is very rapid. After a period of contact sufficient for the removal of practically all mercaptans from the hydrocarbon products, the solution now containing the mercaptans is suitably separated from the product and is regenerated, preferably by oxidation. I have discovered that such solutions can be quickly and readily regenerated in the presence of certain catalysts. I therefore provide suitable catalyst in the solution, the preferred catalyst being sulphides of nickel or cobalt. Oxidation can be effected in a number of ways although I prefer to contact the solution with air. Of course, batch operation need not be followed and the mixture of hydrocarbon and solution can be subject to oxidation in the presence of the catalyst. If air is used, it can be suitably introduced to agitate the mixture as well as oxidize. When reference is made herein to insoluble sulphides this is intended to mean those sulphides normally classed as insoluble in standard reference tables. All sulphides have a finite and determinable solubility and the amount required for catalytic purposes may be less than that corresponding to their solubility in the solution being used. The term "normally insoluble sulphide" is used to cover this condition.

Insoluble sulphides under the proper conditions can become colloidal and the amount which will then be found associated with solution will be substantially greater than corresponds to their solubility. The term "normally insoluble sulphide" is also intended to cover this condition.

By oxidation of the solution in the presence of a catalyst, an organic disulphide is formed which is insoluble in the aqueous solution and which, if desired, can be readily removed from the solution by gravity separation, steaming, air blowing, or other suitable means. This reaction can be represented by either of the two following equations:—

(Eq. 1) $2RSH + \tfrac{1}{2}O_2 = R_2S_2 + H_2O$ (Eq. 2) $2RSNa + \tfrac{1}{2}O_2 + H_2O = R_2S_2 + 2NaOH$ In the above equation R represents any organic radical and R SH any mercaptan. The second equation is probably more accurate as the mercaptans in the solution are probably present as salts.

The sodium hydroxide solution, after being regenerated, is returned to the beginning of the mercaptan removal cycle, or in other words is contacted with a new batch of hydrocarbon product.

It is to be noted that in the above process the initial removal of hydrogen sulphide from the hydrocarbon product makes possible in a subsequent treatment, the removal of mercaptans by the use of a solution which can be regenerated.

I claim:

1. In a process of treating hydrocarbons, the steps of contacting the hydrocarbons with an alkaline solution capable of removing substantially all of the hydrogen sulphide but of a strength insufficient to remove a substantial portion of the mercaptans in the hydrocarbons, subsequently contacting the hydrocarbons with a stronger alkaline solution in the absence of extraneous sulfur to remove mercaptans, and regenerating said last mentioned solution.

2. In a process of removing mercaptans from hydrocarbons, the hydrocarbons being substantially free of hydrogen sulphide, the steps of contacting the hydrocarbons with an alkaline solution, in the absence of extraneous sulfur separating the solution from contact with the hyrocarbons, and effecting regeneration of the solution.

3. In a process of removing mercaptans from hyrocarbon mixture substantially free of hydrogen sulphide, the steps of contacting the mixture with an alkaline solution of such a strength whereby substantially all of the mercaptans are brought into solution in the absence of extraneous sulfur, and effecting regeneration of the solution by oxidation in the presence of an oxidation catalyst.

4. In a process of removing mercaptans from hydrocarbons substantially free of hydrogen sulphide, the steps of contacting the hydrocarbons with a solution of sodium hydroxide of a strength whereby all of the mercaptans are brought into solution in the absence of extraneous sulfur, and effecting regeneration of the solution by oxidation in the presence of an oxidation catalyst.

5. In a process of removing mercaptans from hydrocarbons substantially free of hydrogen sulfide, the steps of contacting the hydrocarbons with a relatively concentrated solution of an alkali, and effecting regeneration of the solution by oxidation in the presence of an oxidation catalyst consisting of a compound of a divalent element of the eighth group of the periodic system.

6. In a process of removing mercaptans from hydrocarbons substantially free of hydrogen sulfide, the steps of contacting the hydrocarbons with a strongly basic solution of an alkali, removing the solution substantially from contact with the hydrocarbons, oxidizing mercaptides in the solution to disulphides in the presence of an oxidation catalyst, and removing the disulphides from the solution.

7. In a process of removing mercaptans from hydrocarbons substantially free of hydrogen sulfide, the step of contacting the hydrocarbons with an alkaline solution having an alkalinity sufficient to effect the removal substantially of mercaptans, removing the solution out of contact with the hydrocarbons, and regenerating the solution by contact with air in the presence of an oxidation catalyst.

8. In a process of removing mercaptans from a hydrocarbon mixture substantially free of hydrogen sulphide, the steps of contacting the mixture with an alkaline solution to remove mercaptans, removing the solution from contact with the mixture, and effecting oxidation of mercaptides in the solution in the presence of an oxidation catalyst consisting of a normally insoluble sulphide.

9. In a process of removing mercaptans from hydrocarbons, substantially free of hydrogen sulphide, the steps of contacting the hydrocarbons with an alkaline solution to remove substantially the mercaptans, substantially separating the solution from contact with the hydrocarbons, and oxidizing mercaptides in the solution by means of air with an essentially catalytic employment of a compound of a divalent element of the eighth periodic group.

10. A process as in claim 9 in which the compound is a sulphide of a divalent element of the eighth periodic group.

11. In a process of removing mercaptans from a hydrocarbon mixture substantially free of hydrogen sulphide, the steps of contacting the mixture with an alkaline solution capable of dissolving the mercaptans in the absence of extraneous sulfur, and contacting with air in the presence of an oxidation catalyst consisting of a normally insoluble sulphide.

12. In a process of removing mercaptans from a hydrocarbon mixture, substantially free of hydrogen sulphide, the steps of contacting the mixture with an alkaline solution capable of dissolving the mercaptans, and contacting with air in the presence of a catalyst consisting of nickel sulphide.

13. In a process of treating hydrocarbons, the steps of contacting the hydrocarbons with an alkaline solution capable of removing substantially all of the hydrogen sulfide but of a strength insufficient to remove a substantial portion of the mercaptans in the hydrocarbons, and subsequently contacting the hydrocarbons with a stronger alkaline solution in the absence of extraneous sulfur to remove mercaptans.

14. In a process of treating hydrocarbons, the step of contacting an alkaline solution of mercaptides in the substantial absence of extraneous sulfur with a free oxygen-containing fluid in the presence of an inorganic sulfide whereby the mercaptide is converted to disulfide.

15. In a process of treating hydrocarbons, the step of effecting direct reaction between mercaptides in alkaline solution and oxygen by means of an essentially catalytic employment of an insoluble metal sulfide in the substantial absence of extraneous sulfur.

16. The process of removing mercaptans from petroleum oil substantially free from hydrogen sulfide which comprises contacting the oil with an aqueous alkaline solution of such a strength whereby substantially all of the mercaptans are brought into solution, separating the bulk of the oil from the alkaline solution and subjecting the latter to oxygen in the presence of an insoluble metal sulfide.

LUDWIG ROSENSTEIN.